(12) United States Patent
Foos et al.

(10) Patent No.: US 6,484,750 B1
(45) Date of Patent: Nov. 26, 2002

(54) COMPRESSED GAS REGULATOR AND FLOWMETER

(75) Inventors: Gary A. Foos; Robert W. Wakeman, both of Watertown, SD (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/612,740

(22) Filed: Jul. 10, 2000

(51) Int. Cl.[7] ............................................... F16K 37/00
(52) U.S. Cl. ................... 137/505.25; 137/557; 137/559; 137/613
(58) Field of Search ...................... 137/505.25, 505.27, 137/504, 551, 557, 559, 613

(56) References Cited

U.S. PATENT DOCUMENTS

| | | | | |
|---|---|---|---|---|
| 2,908,158 A | * | 10/1959 | Jacobsson | 137/505.44 X |
| 3,102,549 A | * | 9/1963 | Worden et al. | 137/505.22 X |
| 3,168,108 A | | 2/1965 | Patrick | |
| 3,442,290 A | | 5/1969 | Phillips | |
| 3,586,045 A | * | 6/1971 | Zimmer | 137/551 |
| 3,646,957 A | | 3/1972 | Allen | |
| 3,671,087 A | | 6/1972 | Pekrul | |
| 3,762,434 A | | 10/1973 | Allen et al. | |
| 3,890,999 A | * | 6/1975 | Moskow | 137/505.25 |
| 3,911,988 A | * | 10/1975 | Richards | 137/505.25 X |
| 4,151,979 A | | 5/1979 | Visalli | |
| 4,253,496 A | | 3/1981 | Wolf et al. | |
| 4,276,902 A | * | 7/1981 | Roth | 137/505.29 X |
| 4,523,516 A | | 6/1985 | Foster et al. | |
| 4,662,603 A | | 5/1987 | Ethridge | |
| 4,791,957 A | * | 12/1988 | Ross | 137/505.25 X |
| 4,799,646 A | * | 1/1989 | Rollett | 251/88 |
| 4,887,637 A | * | 12/1989 | Ketner | 137/504 |
| 5,257,646 A | * | 11/1993 | Meyer | 137/505.25 |
| 5,398,721 A | | 3/1995 | Pryor | |
| 5,899,223 A | * | 5/1999 | Shuman, Jr. | 137/505.25 |

* cited by examiner

*Primary Examiner*—John Rivell
(74) *Attorney, Agent, or Firm*—Fletcher, Yoder & Van Someren

(57) ABSTRACT

An integrated regulator and flow meter assembly having a piston reciprocatingly disposed in an opening of a body member, a support member disposed in the body member opening over the piston, and a flow tube coupled to the support member, wherein an aperture of the support member interconnects a flow conduit of the piston and the flow tube. A spring, preferably a wave spring or disc spring, biases the piston away from an orifice with a valve seat formed thereabout on an end portion of the body member opening. In one embodiment, the piston and a seating surface thereof are formed unitarily of a plastic material.

23 Claims, 3 Drawing Sheets

COMPRESSED GAS REGULATOR AND FLOWMETER

BACKGROUND OF THE INVENTION

The invention relates generally to regulators and flowmeters, and more particularly to integrated compressed gas regulators and flowmeters.

Regulators and flowmeters are known generally, for example to regulate the pressure and monitor the flow of gaseous substances supplied from pressurized cylinders and other containers in the welding and medical industries, among other applications.

An object of the present invention is to provide in some embodiments thereof novel regulators and flowmeters that overcome problems in and improve upon the prior art.

Another object of the invention is to provide in some embodiments thereof novel regulators and flowmeters that are economical.

Another object of the invention is to provide in some embodiments thereof novel regulators and flowmeters that are reliable.

Another object of the invention is to provide in some embodiments thereof novel regulators and flowmeters integrated in a common body member.

Another object of the invention is to provide in some embodiments thereof novel integrated pressure regulators and flowmeters having a spring biased piston and flow tube assembly that may be installed into a body member from one end thereof.

A further object of the invention is to provide in some embodiments thereof novel pressure regulators having a piston and a high pressure seat formed as a single or unitary member, for example from a molded plastic material.

Yet another object of the invention is to provide in some embodiments thereof novel integrated regulators and flowmeters that are more compact.

Another object of the invention is to provide in some embodiments thereof novel pressure regulators having a piston biased by a wave spring or by a disc spring.

Another object of the invention is to provide in some embodiments thereof novel integrated pressure regulators and flowmeters having an inner flow tube that is fixed in relation to a moving piston.

It is also an object of the invention to provide in some embodiments thereof novel integrated pressure regulators and flowmeters having a piston with an outlet coupled to a flow tube by an intermediate support member.

A more particular object of the invention is to provide novel integrated regulator and flow meter assemblies comprising a piston reciprocatingly disposed in an opening of a body member, a flow tube support member disposed in the body member opening over the piston, and a flow tube coupled to the flow tube support member, wherein an aperture of the flow tube support member interconnects a flow conduit of the piston and the flow tube.

Another more particular object of the invention is to provide novel gas pressure regulators comprising a body member having an opening with a side wall and an end portion, a valve seat disposed about a high pressure flow orifice in the opening end portion, a piston reciprocatingly disposed in the body member opening, the piston having a seating surface on an end portion thereof adjacent the valve seat of the opening, the piston and seating surface thereof constitute a unitary plastic member.

Yet another more particular object of the invention is to provide novel integrated compressed gas regulator and flow meter assemblies comprising a body member having an opening, an orifice with a valve seat disposed thereabout on an end portion of the body member opening, a piston having a flow conduit reciprocatingly disposed in the body member opening, the piston having a seating surface on an end portion thereof adjacent the valve seat, a wave spring or a disc spring disposed between a portion of the piston and the end portion of the body member opening, and a flow meter coupled to the body member over the opening thereof, an input of the flow meter coupled to the piston flow conduit.

These and other objects, aspects, features and advantages of the present invention will become more fully apparent upon careful consideration of the following Detailed Description of the Invention and the accompanying Drawings, which may be disproportionate for ease of understanding, wherein like structure and steps are referenced generally by corresponding numerals and indicators.

DETAILED DESCRIPTION OF THE INVENTION

Figure 1:
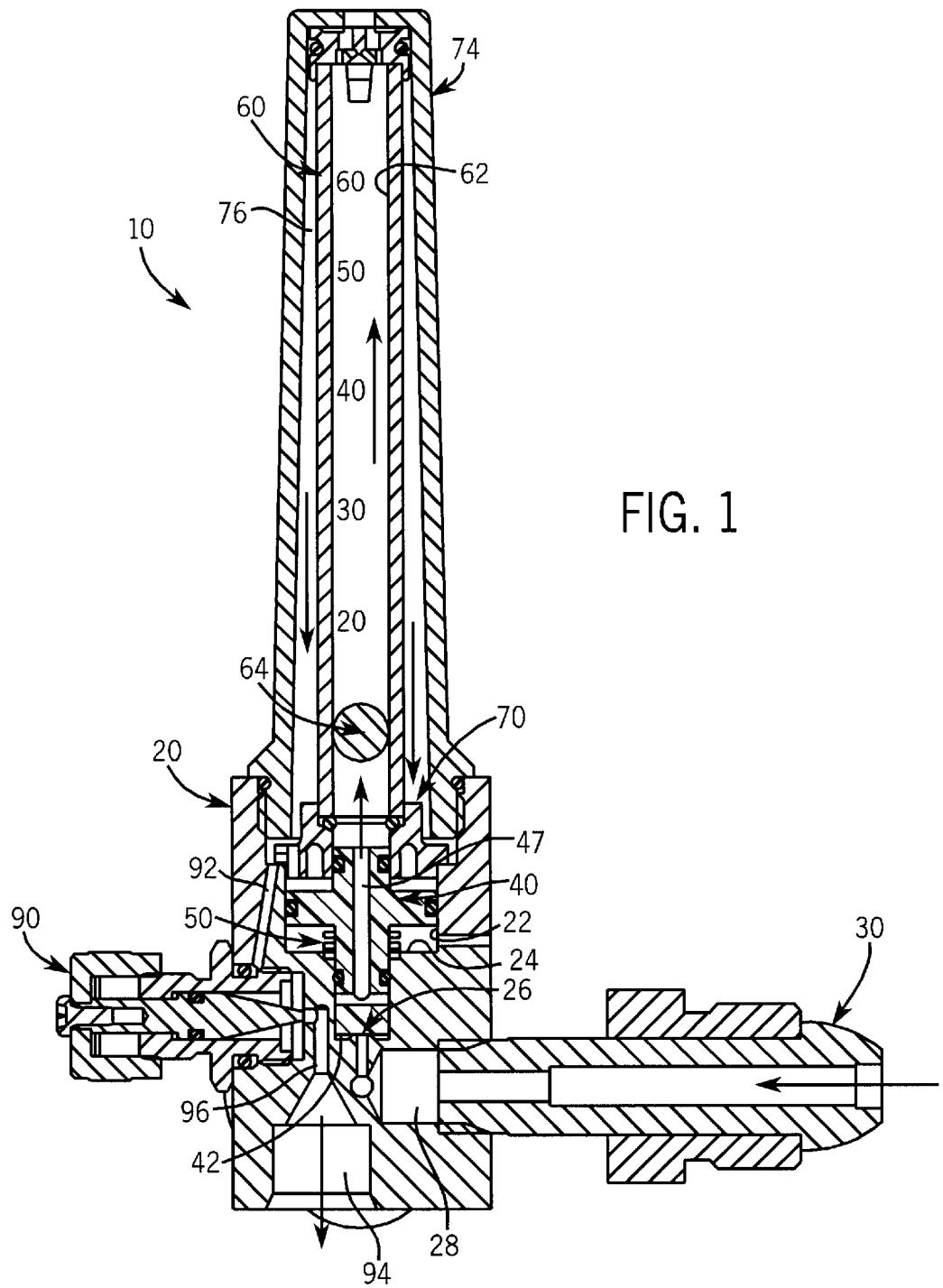
FIG. 1 is an integrated regulator and flow meter assembly according to an exemplary embodiment of the invention.

FIG. 1 illustrates an integrated regulator and flow meter assembly 10 for regulating the pressure and flow of gaseous materials, for example welding gas mixtures supplied from a pressurized container, and for monitoring the flow thereof.

Figure 2:
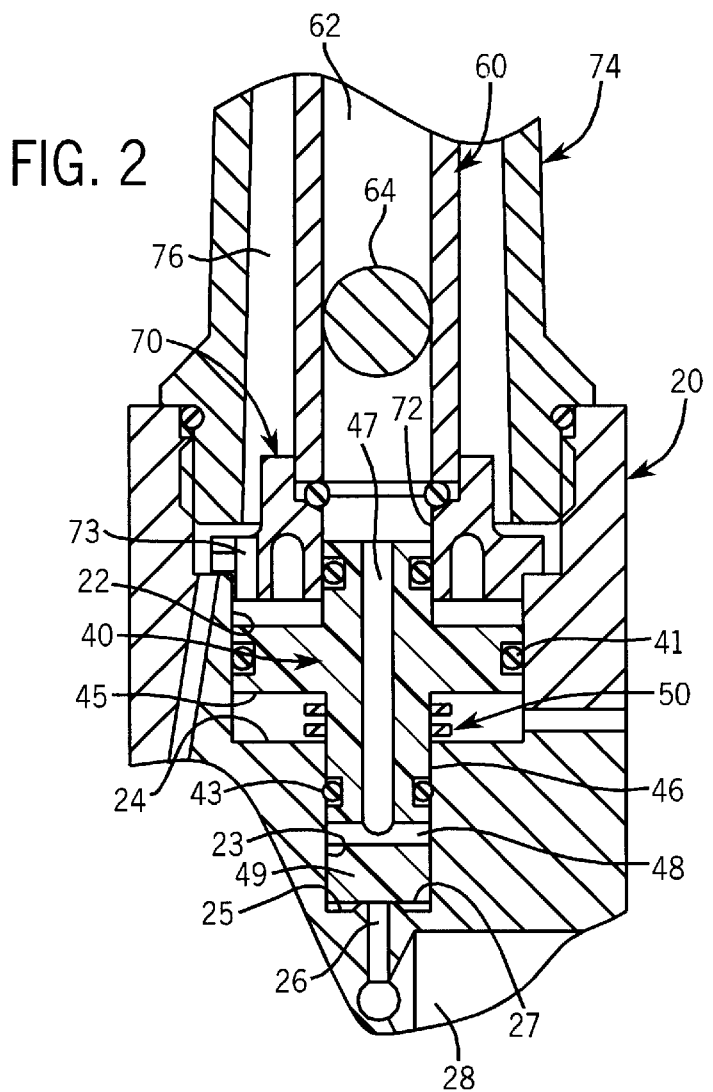
FIG. 2 is an enlarged portion of the assembly of FIG. 1.
Figure 3:
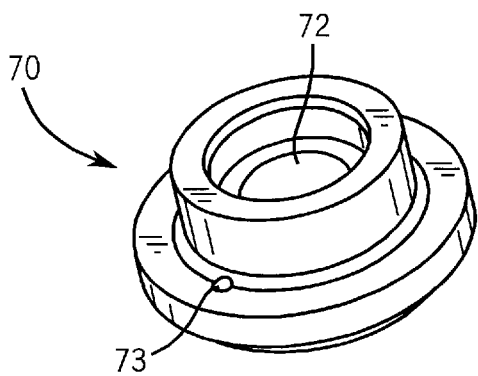
FIG. 3 is a perspective view of an exemplary support member.

In FIGS. 1 and 2, the assembly comprises a body member 20 having an opening with a side wall 22 and an end portion 24. An orifice 26 is disposed in the opening end portion 24 in communication with a high pressure inlet 28 of the body member. In FIG. 2, a valve seat 27 is disposed about the orifice 26 on a recessed end portion 25 of the body member opening.

In FIG. 1, an exemplary inlet connect 30 of the type connectable to pressurized gas cylinders is coupled to the body member inlet 28, for example by threaded engagement therewith. In alternative embodiments, however, other known or specialized connectors may be coupled to the high pressure inlet of the body member.

Figure 4:
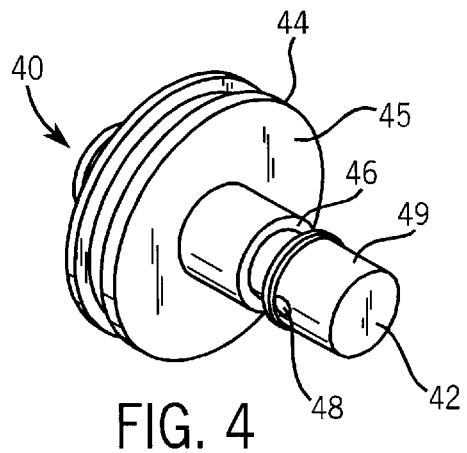
FIG. 4 is a perspective view of an exemplary piston.

In FIG. 1, a piston 40 having a flow conduit therein is disposed reciprocatingly in the body member opening. In FIGS. 1 and 4, the piston 40 includes a seating surface 42 on an end portion thereof. In the exemplary embodiment, the piston 40 also includes a radial flange 44, identified in FIG. 4, protruding from an intermediate portion thereof. The piston however may take other forms.

The piston 40 and the seating surface 42 thereof preferably constitute a unitarily formed member, for example a molded acetal or other polymer material suitable for forming a seating surface that will form a fluid or gas tight seal against the valve seat on the body member opening.

In other embodiments, the piston and seating surface thereof may be formed separately, for example by inserting a discrete seating surface member or by molding a seating surface material in an opening on a bottom portion of a partially formed piston.

A seal is preferably disposed between the piston and a portion of the body member opening, preferably the opening side wall portion. In the exemplary embodiment of FIG. 2, a first o-ring 41 seated about the piston flange is disposed against the opening side wall 22, and a second o-ring 43 seated about another cylindrical portion 46 of the piston is disposed against an opening side wall portion 23 that is recessed below the opening end portion 24.

A spring is disposed between the piston and a portion of the body member opening to bias the piston and particularly the seating surface thereof away from the valve seat. In FIG. 2, a spring 50 is disposed about the cylindrical portion 46 of the piston between a side 45 of the radial flange thereof and the opening end portion 24 of the body member.

Figure 5:
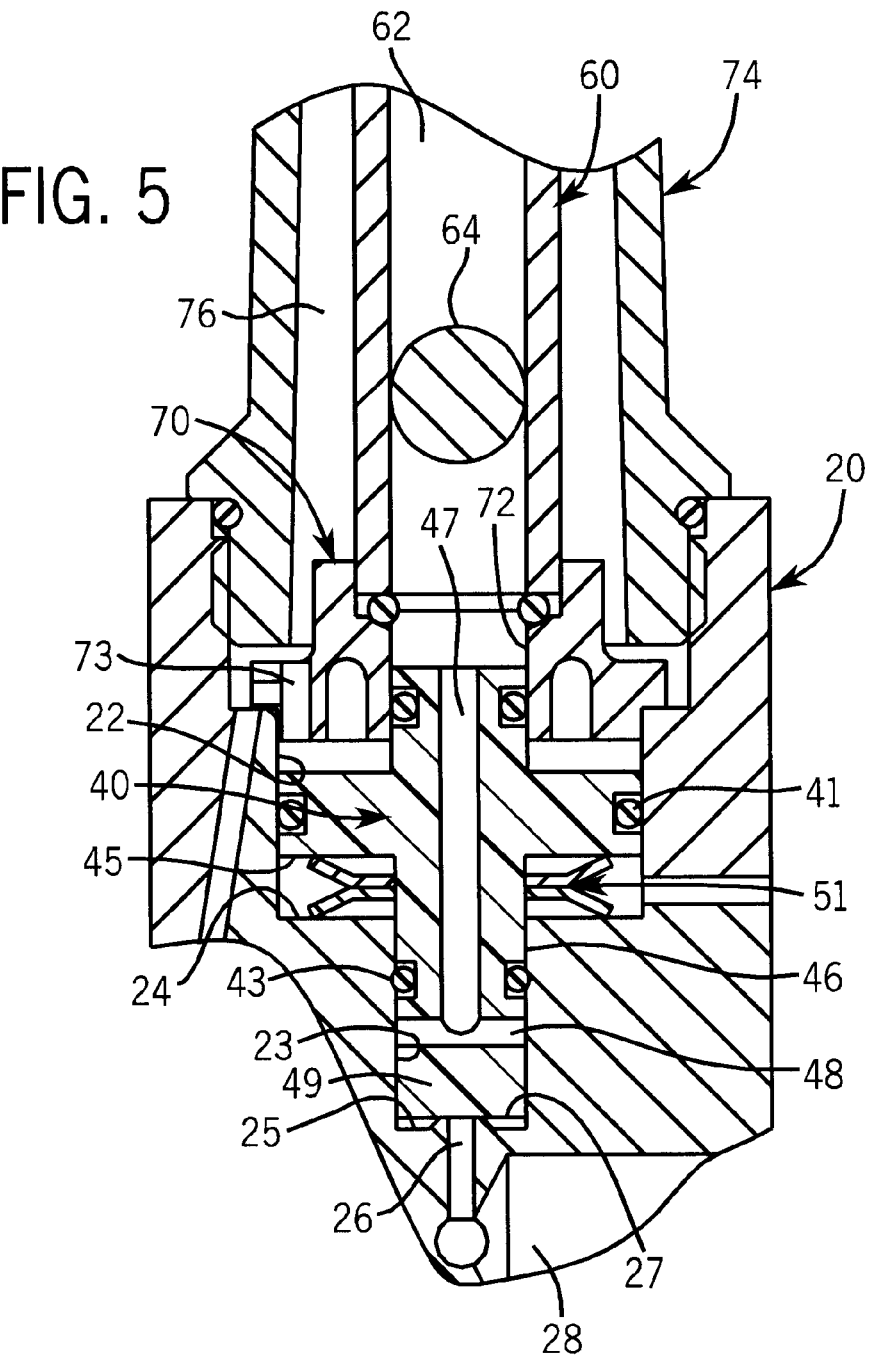
FIG. 5 is an enlarged portion of the assembly of FIG. 1, illustrating an alternative embodiment that utilizes disc springs.

The spring is preferably a wave spring or a disc spring. The springs 50 illustrated in FIGS. 1 and 2 are wave springs. The springs 51 illustrated in FIG. 5 are disc springs. Disc springs are generally used in applications where greater spring force is required. In some embodiments several wave springs or disc springs are stacked together.

A wave spring suitable for use with the present invention is wave spring Model No. M-043, by Smalley Steel Ring Company, Wheeling, Ill. A disc spring suitable for use with the invention is disc spring Model No. CDM-186204, by Century Spring Corporation, Los Angeles, Calif.

In alternative embodiments, the spring 50 may comprise a coil spring. The preferred wave spring and disc spring embodiments however have the advantage of providing the same biasing force on the piston as comparatively large coil springs, thus providing more compact assemblies.

In FIG. 2, when the piston is moved away from the valve seat 27, fluid flows from the orifice 26 to an axial flow conduit 47 of the piston via one or more generally radial flow ports 48. A space between the recessed side wall portion 23 and a reduced diameter portion 49 of the piston permits the flow of gas from the orifice 26 to the piston port 48.

In some embodiments of the present invention, a flow meter is coupled to the body member 20. In FIGS. 1 and 2, the flow meter includes a flow tube 60 coupled to a support member 70 disposed in the body member opening over the piston.

In FIG. 2, the support member 70 has an aperture 72 that interconnects the flow conduit 47 of the piston and a passage 62 through the flow tube 60 in which a float 64 is elevated relative to a flow scale gradations by the flow of gas through the flow tube. An o-ring preferably provides a seal between the flow tube and the support member aperture.

In FIG. 2, the support member 70 is preferably fixed axially in the opening of the body member. A portion of the piston opposite the end portion thereof having the seating surface is reciprocatingly disposed in the aperture 72 of the fixed support member, preferably with an o-ring disposed therebetween, thereby fixing the flow tube 60 relative to the body member 20 and the reciprocating piston 40.

The support member provides support for the piston and for the flow tube. In embodiments without a flow meter, for example in regulator only applications, the support member 70 provides support for an upper portion of the piston.

The support member 70 preferably includes one or more openings or ports 73 therein to provide gas or fluid flow back pressure on the piston, thus counteracting the bias of spring 50. In other embodiments, however, the port or ports 73 may be formed in the body member for this purpose.

In FIGS. 1 and 2, an outer tube 74 is coupled to the body member 20 about the flow tube 60 forming a flow path 76 therebetween. The gas or fluid flows from the piston conduit 47, through the flow tube passage 62 toward an upper end thereof, through radial ports in the flow tube, and then back down through the flow path 76.

In FIG. 1, the exemplary assembly also comprises a flow control valve 90 having a flow inlet coupled to the flow path 76 by a conduit 92 formed in the body member 20. A controlled flow outlet of the flow control valve 90 is coupled to a flow outlet 94 of the body member by another conduit 96 formed therein.

While the foregoing written description of the invention enables one of ordinary skill to make and use what is considered presently to be the best mode thereof, those of ordinary skill will understand and appreciate the existence of variations, combinations, and equivalents of the specific exemplary embodiments herein. The invention is therefore to be limited not by the exemplary embodiments herein, but by all embodiments within the scope and spirit of the appended claims.

What is claimed is:

1. An integrated regulator and flow meter assembly comprising:
   a body member having an opening;
   a piston having a flow conduit, the piston reciprocatingly disposed in the opening of the body member;
   a flow tube support member having an aperture, the flow tube support member disposed in the opening of the body member over the piston;
   a flow tube adapted to provide an indication of gas flow through the integrated regulator and flow meter assembly, the flow tube being aligned by the flow tube support member,
   wherein the aperture of the flow tube support member interconnects the flow conduit of the piston and the flow tube.

2. The assembly of claim 1, the flow tube support member fixed axially in the opening of the body member, a portion of the piston reciprocatingly disposed in the aperture of the flow tube support member.

3. The assembly of claim 1, a spring disposed in the opening of the body member between a portion thereof and a portion of the piston opposite the flow tube support member.

4. The assembly of claim 1 is an integrated compressed gas regulator and flow meter, a high pressure flow orifice in the opening of the body member, a valve seat disposed about the orifice, a seating surface on an end portion of the piston, the piston and seating surface thereof constitute a unitarily formed plastic member.

5. The assembly of claim 4, the body member opening having a side wall and an end portion with the valve seat recessed therein, the piston having a radial flange protruding from an intermediate portion thereof, a spring disposed about a portion of the piston between the radial flange thereof and the end portion of the opening.

6. The assembly of claim 5, the flow tube support member fixed axially in the opening of the body member, a portion of the piston opposite the end portion thereof having the seating surface reciprocatingly disposed in the aperture of the flow tube support member, a seal disposed between the piston and the side wall of the body member opening.

7. The assembly of claim 6, the spring is one of a wave spring or disc spring.

8. The assembly of claim 6, a high pressure flow inlet on the body member coupled to the orifice in the opening thereof, an outer tube coupled to the body member and disposed about the flow tube forming a flow path therebetween, a flow control valve having a flow inlet coupled to the flow path between the outer tube and the flow tube, the flow control valve having a flow outlet coupled to a flow outlet of the body member.

9. A pressure regulator comprising:

a body member;

an opening in the body member, the opening having a side wall and an end portion;

a valve seat disposed about a high pressure flow orifice in the end portion of the body member opening;

a piston reciprocatingly disposed in the body member opening, the piston having an integrally formed seating surface on an end portion thereof adjacent the valve seat of the opening; and a support member having an aperture fixed axially in the body member opening opposite the end portion thereof, the piston disposed between the end portion of the body member opening and the support member, a portion of the piston opposite the end portion thereof having the seating surface reciprocatingly disposed in the aperture of the support member.

10. The regulator of claim 9, the piston having a radial flange protruding from a portion thereof between the end portion having the seating surface thereon and the portion of the piston disposed in the aperture of the support member, a spring disposed about a portion of the piston between the radial flange thereof and the end portion of the body member opening.

11. The regulator of claim 10, the orifice and valve seat recessed in the end portion of the body member opening, a seal disposed between a portion of the piston and the side wall of the body member opening.

12. The regulator of claim 10, the spring is one of a disc spring or wave spring.

13. The regulator of claim 9, spring disposed in the opening of the body member between the end portion thereof and a portion of the piston opposite the support member.

14. The regulator of claim 13, the spring is one of a wave spring or disc spring.

15. The regulator of claim 9, further comprising a fluid flowmeter coupled to the body member.

16. An integrated compressed gas regulator and flowmeter assembly comprising:

a body member having an opening with a side wall and end portion;

a high pressure flow orifice with a valve seat disposed thereabout on the end portion of the body member opening;

a piston having a flow conduit reciprocatingly disposed in the body member opening, the piston having a seating surface on an end portion thereof adjacent the valve seat;

a wave spring disposed between a portion of the piston and the end portion of the body member opening;

a flowmeter coupled to the body member over the opening thereof, an input of the flow meter coupled to the piston flow conduit; and a support member fixed axially in the opening of the body member, a portion of the piston opposite the end portion thereof having the seating surface thereon reciprocatingly disposed in an aperture of the support member.

17. The assembly of claim 16, the piston having a radial flange protruding from an intermediate portion thereof, the wave spring disposed about a portion of the piston between the radial flange thereof and the end portion of the body member opening, a seal disposed between the piston and the side wall of the body member opening.

18. The assembly of claim 16, the flowmeter coupled to the support member, the aperture of the support member interconnects the flow conduit of the piston and the flow meter.

19. The assembly of claim 18, an outer tube of the flow meter disposed over a flow tube thereof and coupled to the body member, a flow control valve having a flow inlet coupled to a flow path between the outer tube and the flow tube, the flow control valve having a flow outlet coupled to an outlet of the body member.

20. The assembly of claim 16, wherein the wave spring comprises a plurality of wave springs.

21. An integrated compressed gas regulator and flow meter assembly comprising:

a body member having an opening with a side wall and end portion;

a high pressure flow orifice with a valve seat disposed thereabout on the end portion of the body member opening;

a piston having a flow conduit reciprocatingly disposed in the body member opening, the piston having a seating surface on an end portion thereof adjacent the valve seat;

a disc spring disposed between a portion of the piston and the end portion of the body member opening;

a flowmeter coupled to the body member over the opening thereof, an input of the flowmeter coupled to the piston flow conduit; and a support member fixed axially in the body member opening, a portion of the piston opposite the end portion thereof having the seating surface thereon reciprocatingly disposed in an aperture of the support member.

22. The assembly of claim 21, the flowmeter coupled to the support member, the aperture of the support member interconnects the flow conduit of the piston and the flow meter.

23. The assembly of claim 21, wherein the disc spring comprises a plurality of disc springs.

* * * * *